(12) United States Patent
Heavens et al.

(10) Patent No.: US 10,941,795 B2
(45) Date of Patent: Mar. 9, 2021

(54) CLIPPING BUSHING DEVICE OF FASTENER ASSEMBLY

(71) Applicant: ILLINOIS TOOL WORKS INC., Glenview, IL (US)

(72) Inventors: Glenn G. Heavens, Naugatuck, CT (US); Ronald Carter Owens, Lawrenceburg, KY (US); Chad Michael Clark, Stamping Ground, KY (US)

(73) Assignee: Illinois Tool Works Inc., Glenview, IL (US)

( * ) Notice: Subject to any disclaimer, the term of this patent is extended or adjusted under 35 U.S.C. 154(b) by 19 days.

(21) Appl. No.: 16/483,708

(22) PCT Filed: Feb. 22, 2018

(86) PCT No.: PCT/US2018/019207
§ 371 (c)(1),
(2) Date: Aug. 5, 2019

(87) PCT Pub. No.: WO2018/160429
PCT Pub. Date: Sep. 7, 2018

(65) Prior Publication Data
US 2020/0018340 A1    Jan. 16, 2020

Related U.S. Application Data

(60) Provisional application No. 62/464,447, filed on Feb. 28, 2017.

(51) Int. Cl.
*F16B 5/02* (2006.01)
*F16B 21/07* (2006.01)

(52) U.S. Cl.
CPC .......... *F16B 5/0258* (2013.01); *F16B 21/075* (2013.01)

(58) Field of Classification Search
CPC .... F16B 5/0642; F16B 5/0258; F16B 21/075; F16B 21/086; B60R 16/0222
(Continued)

(56) References Cited

U.S. PATENT DOCUMENTS 5,632,581 A   5/1997   Hasada
5,641,255 A   6/1997   Tanaka
(Continued)

FOREIGN PATENT DOCUMENTS

CN    101063461 A    10/2007
CN    102362079 A     2/2012
(Continued)

OTHER PUBLICATIONS

International Search Report for PCT/US2018/019207, dated May 25, 2018.
(Continued)

*Primary Examiner* — Jeffrey O'Brien
(74) *Attorney, Agent, or Firm* — Quarles & Brady LLP

(57) ABSTRACT

A bushing device includes a cap end shaped to engage a first surface of a first component having a first hole, and a slotted barrel body coupled with the cap end and elongated along a center axis. The slotted barrel body includes plural first cantilevered beam legs extending away from the cap end in directions that are parallel to the center axis. One or more of the first cantilevered beam legs has a hook at a distal end of the one or more first cantilevered beam legs. The slotted barrel body is shaped to fit inside the first hole in the first component and into a concentric second hole in a second component. The hook of the one or more first cantilevered beam legs is positioned to engage the second component to secure the first component and the second component together.

18 Claims, 11 Drawing Sheets

(58) Field of Classification Search
USPC .............. 16/2.1, 2.2, 2.3, 2.4, 2.5; 24/297; 411/508
See application file for complete search history.

(56) References Cited

U.S. PATENT DOCUMENTS

| | | | |
|---|---|---|---|
| 7,207,759 B2* | 4/2007 | Kato | F16B 19/1081 411/41 |
| 7,237,995 B2* | 7/2007 | Randez Perez | F16B 5/065 24/293 |
| 8,261,409 B2* | 9/2012 | Magennis | F16L 5/027 16/2.1 |
| 9,038,239 B2* | 5/2015 | Allen | A61L 2/26 16/2.1 |
| 10,738,811 B2* | 8/2020 | Mahoney | F16B 17/008 |
| 2003/0131443 A1* | 7/2003 | Trent | B60R 13/0846 16/2.1 |
| 2003/0143053 A1 | 7/2003 | Kanie | |
| 2007/0253794 A1 | 11/2007 | Zhang et al. | |
| 2012/0192379 A1* | 8/2012 | Amirian | F16B 9/056 16/2.5 |

FOREIGN PATENT DOCUMENTS

| | | |
|---|---|---|
| CN | 104094400 A | 10/2014 |
| EP | 1323932 A1 | 7/2003 |

OTHER PUBLICATIONS

First Office Action and Search Report from corresponding Chinese Patent Application No. 201880014010.7, dated Nov. 11, 2020 (22 pages).

* cited by examiner

CLIPPING BUSHING DEVICE OF FASTENER ASSEMBLY

RELATED APPLICATIONS

This application represents the United States National Stage of International Application No. PCT/US2018/019207, filed Feb. 22, 2018, which claims priority to U.S. Provisional Patent Application No. 62/464,447, entitled "Clipping Bushing," and filed Feb. 28, 2017, which are hereby incorporated by reference in their entirety.

FIELD OF EMBODIMENTS OF THE DISCLOSURE

Embodiments of the present disclosure generally relate to fastener assemblies, and more particularly, to a drawn metal bushing of a fastener assembly.

BACKGROUND

Fastener assemblies are used to secure various components together in a variety of applications. A fastener assembly may include a bushing that is inserted into a hole through a component. The bushing typically includes a central passage that is configured to receive and retain a fastener, such as a bolt.

A known bushing is welded to a component. In particular, the bushing may be projection welded to a stamped metal component to secure the bushing to the component. This welding, however, adds additional labor, cost, and complexity to the assembly. As an alternative, an adhesive may be applied to the component to secure the bushing thereto. The adhesive can prevent components that include the adhesive from passing cleanliness inspections.

SUMMARY OF EMBODIMENTS OF THE DISCLOSURE

In one embodiment, a bushing device is provided that includes a cap end shaped to engage a first surface of a first component having a first hole, and a slotted barrel body coupled with the cap end and elongated along a center axis. The slotted barrel body includes plural first cantilevered beam legs extending away from the cap end in directions that are parallel to the center axis. One or more of the first cantilevered beam legs has a hook at a distal end of the one or more first cantilevered beam legs. The slotted barrel body is shaped to fit inside the first hole in the first component and into a concentric second hole in a second component. The hook of the one or more first cantilevered beam legs is positioned to engage the second component to secure the first component and the second component together.

In one embodiment, a bushing device includes a cap end shaped to engage a first surface of a first component having a first hole, and a slotted barrel body coupled with the cap end and elongated along a center axis. The slotted barrel body includes first and second cantilevered beam legs extending away from the cap end in directions that are parallel to the center axis. The first cantilevered beam legs have hooks at distal ends of the first cantilevered beam legs. The second cantilevered beam legs have concave surfaces that are curved toward the center axis. The slotted barrel body is shaped to fit inside the first hole in the first component and into a concentric second hole in a second component. The hooks of the first cantilevered beam legs are positioned to engage the second component and the concave surfaces of the second cantilevered beam legs are shaped to engage a fastener inserted into the barrel body to secure the first component and the second component together.

In one embodiment, a bushing device includes a cap end shaped to engage a first surface of a first component having a first hole. The cap end includes a center rim portion that encircles a center opening through the cap end and an outer rim portion that encircles the center rim portion and that is disposed radially outside of the center rim portion. The bushing device also includes a slotted barrel body coupled with the cap end and elongated along a center axis, the slotted barrel body including cantilevered beam legs extending away from the cap end in directions that are parallel to the center axis. The cantilevered beam legs have one or more hooks at distal ends of the cantilevered beam legs. The slotted barrel body is shaped to fit inside the first hole in the first component and into a concentric second hole in a second component. The one or more hooks of the cantilevered beam legs are positioned to engage the second component and the concave surfaces of the second cantilevered beam legs are shaped to engage a fastener inserted into the barrel body through the center opening in the end cap to secure the first component and the second component together. The center rim portion of the end cap is located farther from the cantilevered beam legs than the outer rim portion of the end cap. The center rim portion of the end cap is configured to impart a spring force on one or more of the fastener or the first component responsive to the fastener being inserted into the center opening of the end cap.

DETAILED DESCRIPTION

Embodiments of the present disclosure provide a bushing device that is configured to securely fasten to one or more components by engaging one component and clipping or hooking onto at least one other component. In at least embodiment, the bushing device is a drawn metal bushing device having a segmented or slotted barrel that may be configured to retain a fastener (such as a bolt). The bushing device is configured to retain or capture one or more components (such as substrate panels) to another component (such as a thin sectioned substrate panel).

Figure 1:
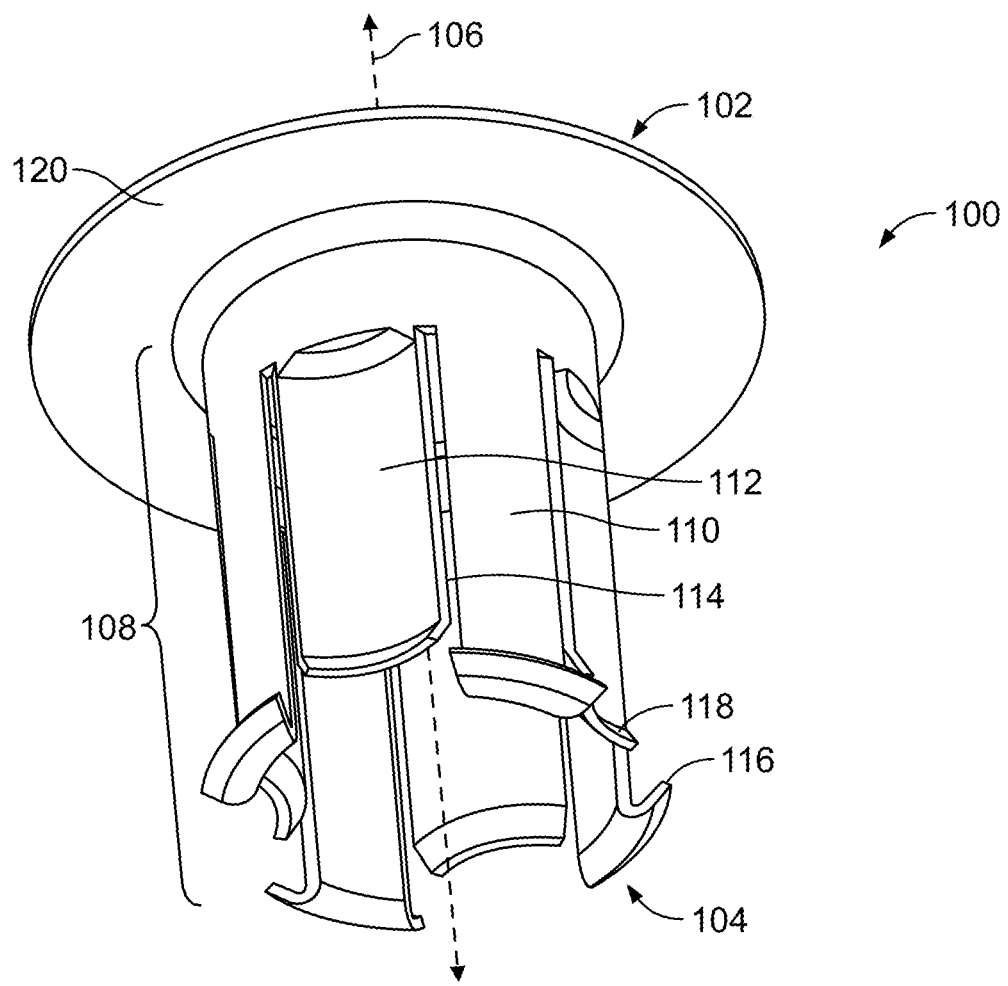
FIG. 1 illustrates one embodiment of a perspective view of a bushing device.
Figure 2:
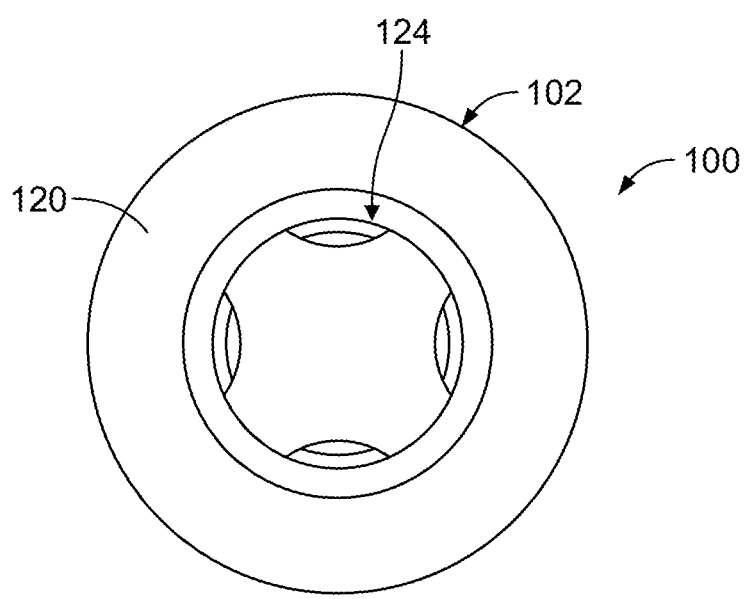
FIG. 2 illustrates a top view of the bushing device shown in FIG. 1.
Figure 3:
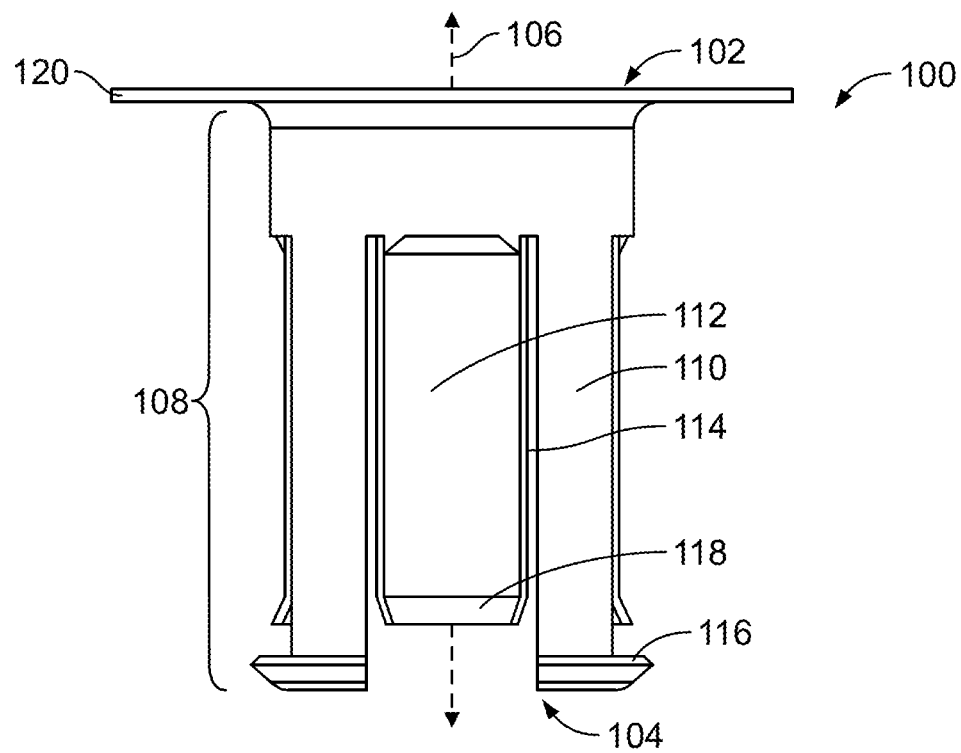
FIG. 3 is a side view of the bushing device shown in FIGS. 1 and 2.

FIG. 1 illustrates one embodiment of a perspective view of a bushing device 100. FIG. 2 illustrates a top view of the bushing device 100 shown in FIG. 1. FIG. 3 is a side view of the bushing device 100 shown in FIGS. 1 and 2. The bushing device 100 is an elongated component that extends from a cap end 102 to an opposite insertion end 104. The bushing device 100 can be elongated in a direction that extends along a center axis 106 from the cap end 102 to the insertion end 104. The bushing device 100 can be symmetric around or about the center axis 106 in one embodiment.

The bushing device 100 has a barrel body 108 that extends along the center axis 106 from the cap end 102. The barrel body 108 has a slotted cylindrical shape that circumferentially surrounds the center axis 106 such that no part of the barrel body 108 contacts or extends across the center axis 106 in the illustrated embodiment. Alternatively, the barrel body 108 may be at least partially filled so that the center axis 106 extends through at least part of the barrel body 108.

The barrel body 108 is formed from several elongated legs 110, 112. The legs 110, 112 are segmented portions of the barrel body 108 that are separated from each other along a circumference or outer perimeter of the barrel body 108 by axial gaps 114. The axial gaps 114 extend from the insertion end 104 of the barrel body 108 (and of the bushing device 100) toward, but not all the way to, the cap end 102 of the bushing device 100. For example, the axial gaps 114 can extend from the insertion end 104 of the barrel body 108 to locations that are three quarters or seventy-five percent of the distance from the insertion end 104 to the interface between the barrel body 108 and the cap end 102. Alternatively, the axial gaps 114 can extend a smaller or longer distance from the insertion end 104.

The axial gaps 114 segment the legs 110, 112 such that the legs 110, 112 are cantilevered beams. The legs 110, 112 can individually flex or bend inward toward the center axis 106 responsive to application of a force applied radially inward toward the center axis 106. The legs 110, 112 can return to the original positions shown in FIGS. 1 and 3 responsive to removal of the radially inward force. Optionally, the legs 110, 112 can individually flex or bend inward toward the center axis 106 responsive to application of a force applied radially outward from the center axis 106. The legs 110, 112 can return to the original positions shown in FIGS. 1 and 3 responsive to removal of the radially outward force.

In the illustrated embodiment, the legs 110, 112 include four sets of opposing pairs of legs 110, 112. Each of these pairs can include two convex legs 110 or two concave legs 112. The convex legs 110 include outer surfaces that are curved outward in directions radially away from the center axis 106. Conversely, the concave legs 112 include outer surfaces that are curved inward in directions radially toward the center axis 106. As a result, the outer surfaces of the convex legs 110 can be located farther distances from the center axis 106 than the outer surfaces of the concave legs 112. Alternatively, a different number of pairs of the legs 110, 112 can be provided, the legs 110, 112 may not be provided in pairs, or a different number of the legs 110 and/or the legs 112 may be included.

The legs 110, 112 can extend along the center axis 106 to different distances from the cap end 102. In the illustrated embodiment, the convex legs 110 are longer than the concave legs 112 in directions that are parallel to the center axis 106. Alternatively, the concave legs 112 are longer than the convex legs 110 in directions that are parallel to the center axis 106. In another embodiment, the convex legs 110 and the concave legs 112 are the same lengths in directions parallel to the center axis 106.

The convex legs 110 can include clipping hooks 116 at distal ends of the convex legs 110 (e.g., at the insertion end 104). The clipping hooks 116 include lengths of the convex legs 110 that bend slightly outward (away from the center axis 106) and slightly upward (along the center axis 106) to form shapes of the letter J. For example, the hooks 116 can be formed from distal end portions of the convex legs 110 that fold back toward the convex legs 110 outside of the convex legs 110. The folded back portion of the convex leg 110 that forms the hook 116 for that leg 110 is oriented at an acute angle with respect to the remainder of the convex leg 110 in the illustrated embodiment. Alternatively, the portion of the convex leg 110 that forms the hook 116 can be oriented at a different angle, such as a perpendicular angle or an obtuse angle with respect to the remainder of the convex leg 110. In another embodiment, one or more (or all) of the convex legs 110 do not include the clipping hook 116.

The concave legs 112 can include ramps 118 at distal ends of the concave legs 112 (e.g., at or near the insertion end 104). The ramps 118 include lengths of the concave legs 112 that are angled outward away from the center axis 106. The ramps 118 are oriented at obtuse angles with respect to the remainders of the concave legs 112 in the illustrated embodiment. Alternatively, the portion of the concave leg 112 that forms the ramp 118 can be oriented at a different angle, such as a perpendicular angle or an acute angle with respect to the remainder of the concave leg 112. In another embodiment, one or more (or all) of the concave legs 112 do not include the ramp 118.

The cap end 102 of the bushing device 100 includes a flange 120 that radially protrudes away from the center axis 106. In the embodiment shown in FIG. 2, the flange 120 extends around the perimeter of a center opening 124 through the cap end 102. The center opening 124 can be aligned with the center axis 106 such that the center axis 106 extends through the center opening 124 with the flange 120 radially outside of the center opening 124.

The flange 120 can radially protrude farther from the center axis 106 than the legs 110, 112, the hooks 116, and the ramps 118 in the illustrated embodiment. The clipping hooks 116 of the legs 110 deflect into a securing position in relation to a chamfered or counter-bore hole on an opposite surface of a thin section component. The clipping hooks 116 engage the section component to cause the bushing device 100 to compressively sandwich the section component and at least one other component between the clipping hooks 116 and the flange 120 of the cap end 102. The interior surfaces of the concave legs 112 are positioned to interfere with (e.g., engage) a major pitch diameter of a threaded fastener (e.g., a screw). The fastener may be securely retained by the inwardly-directed surfaces of the concave legs 112 through frictional engagement between the fastener and the inner surfaces of the concave legs 112. The concave legs 112 may slightly deflect outward when the fastener is into the interior of the bushing device 100 (e.g., along the center axis 106).

Figure 4:
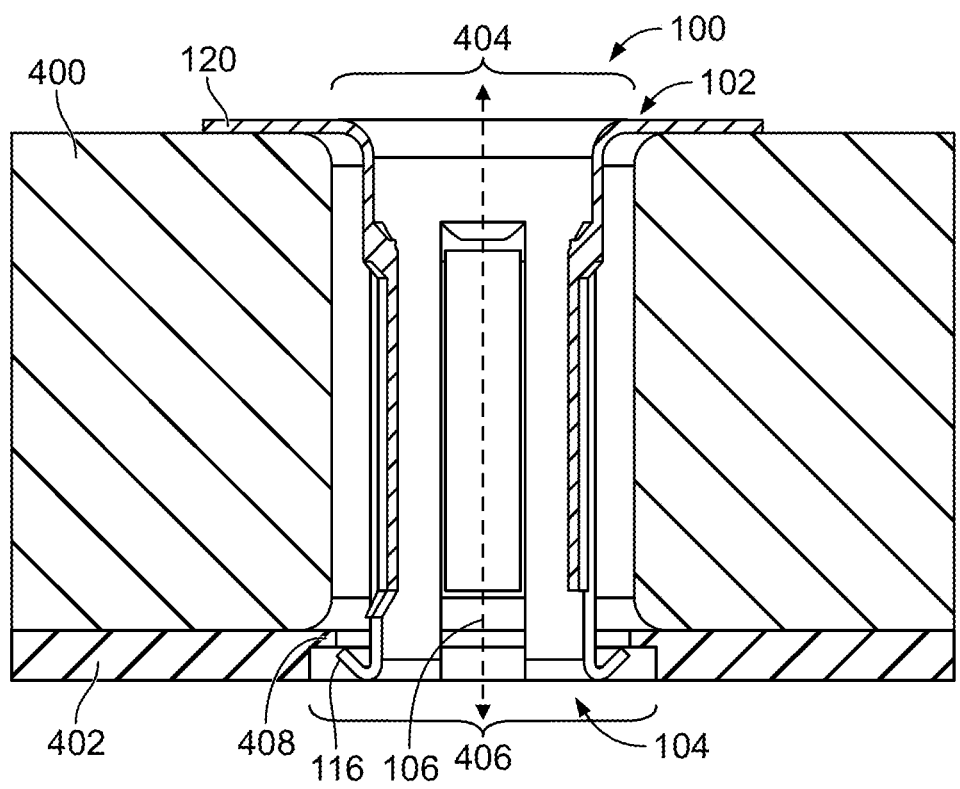
FIG. 4 illustrates a cross-sectional view of one embodiment of the bushing device securing components together.

FIG. 4 illustrates a cross-sectional view of one embodiment of the bushing device 100 securing a first component 400 to a second component 402. The first component 400 can be a clamping plate and the second component 402 can be thin sheet metal. The bushing device 100 is inserted into concentric holes 404, 406 in the components 400, 402, such as by inserting the insertion end 104 of the bushing device 100 into the holes 404, 406. The hole 406 can be a counterbore in the second component 402. The flange 120 of the cap end 102 of the bushing device 100 engages an outer surface of the first component 400. The hooks 116 of the bushing device 100 can engage a ledge 408 inside the hole 406 in the second component 402 that is formed by the counterbore hole 406. For example, as the bushing device 100 is inserted into the holes 404, 406, the hooks 116 may be pressed inward toward the center axis 106 and then snap outward away from the center axis 106 after the hooks 116 are inserted beyond the ledge 408. The hooks 116 can engage a side of the flange 120 that is opposite of the outer surface of the first component 400 that is engaged by the flange 120. The flange 120 and the hooks 116 can be separated from each other along directions that are parallel to the center axis 106 by a distance that is small enough to compress or sandwich the components 400, 402 against each other.

Figure 5:
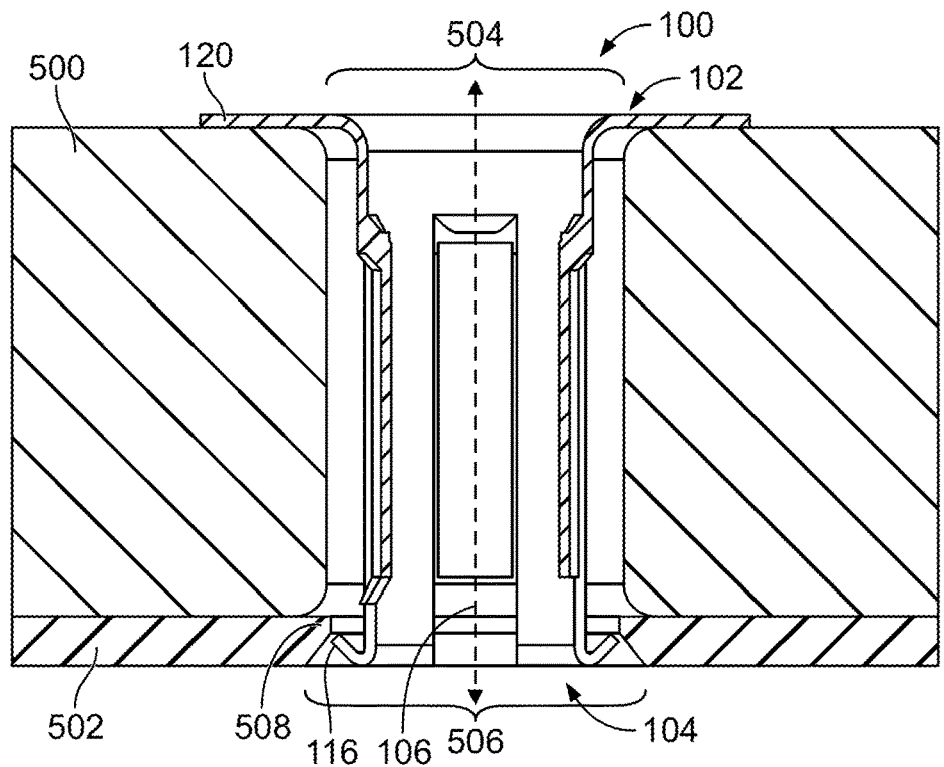
FIG. 5 illustrates a cross-sectional view of one embodiment of the bushing device shown in FIG. 1 securing components with each other.

FIG. 5 illustrates a cross-sectional view of one embodiment of the bushing device 100 securing a third component 500 to a fourth component 502. The third component 500 can be a clamping plate (e.g., the same clamping plate 400 or a different clamping plate) and the second component 502 can be thin sheet metal (e.g., the same sheet metal 402 or a different piece of sheet metal). The bushing device 100 is inserted into concentric holes 504, 506 in the components 500, 502, such as by inserting the insertion end 104 of the bushing device 100 into the holes 504, 506. The hole 506 can be a countersink in the second component 502. The flange 120 of the cap end 102 of the bushing device 100 engages an outer surface of the first component 500. The hooks 116 of the bushing device 100 can engage a ledge 508 inside the hole 506 in the second component 502 that is formed by the countersink hole 506.

For example, as the bushing device 100 is inserted into the holes 504, 506, the hooks 116 may be pressed inward toward the center axis 106 and then snap outward away from the center axis 106 after the hooks 116 are inserted beyond the ledge 508. The hooks 116 can engage a side of the flange 120 that is opposite of the outer surface of the third component 500 that is engaged by the flange 120. The flange 120 and the hooks 116 can be separated from each other along directions that are parallel to the center axis 106 by a distance that is small enough to compress or sandwich the components 500, 502 against each other.

Figure 6:
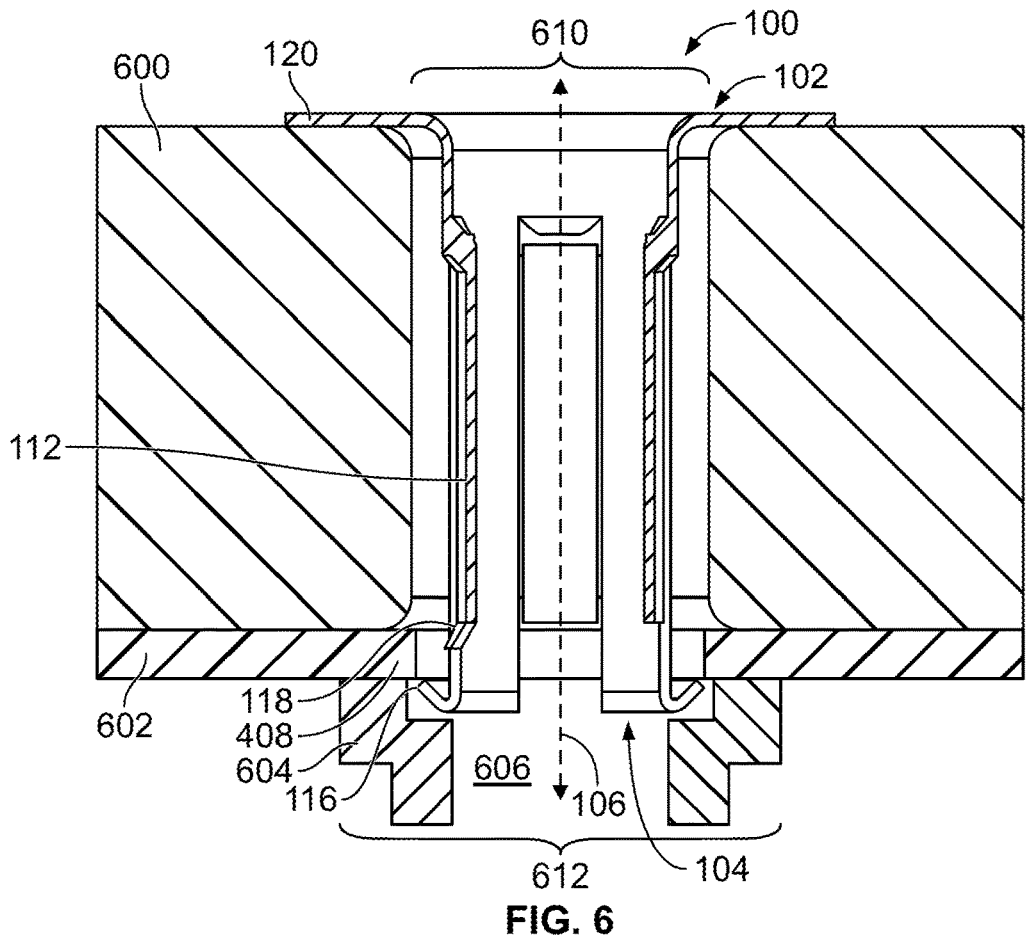
FIG. 6 illustrates a cross-sectional view of one embodiment of the bushing device shown in FIG. 1 securing components together.

FIG. 6 illustrates a cross-sectional view of one embodiment of the bushing device 100 securing a fifth component 600 to a sixth component 602. In the illustrated example, the sixth component 602 is located between the fifth component 600 and a seventh component 604, such as an object having a threaded hole 606 with a wider opening at the interface between the sixth and seventh components 602, 604. This wider opening forms a housing or space in which the hooks 116 of the bushing device 100 are located.

The fifth component 600 and/or seventh component 604 can be a clamping plate and the sixth component 602 can be thin sheet metal. The bushing device 100 is inserted into concentric holes 610, 612 in the components 600, 602, such as by inserting the insertion end 104 of the bushing device 100 into the holes 610, 612. The flange 120 of the cap end 102 of the bushing device 100 engages an outer surface of the fifth component 600. As shown in FIG. 6, the hooks 116 of the bushing device 100 may be too far from the edges of the hole 612 to allow the hooks 116 to engage the sixth component 604.

A threaded fastener (e.g., a screw) can be inserted into the bushing device 100 through the insertion end 104 to secure the hooks 116 to the sixth component 602. For example, the threaded fastener can be inserted through the seventh component 604 through threaded hole 606 in an upward direction in the perspective of FIG. 6. The threads of the fastener can engage the inner surfaces of the threaded hole 606 in the seventh component 604 to secure the fastener to the seventh component 604. Optionally, the threads also can engage the inner surfaces of the concave legs 112 of the bushing device 100 to secure the fastener to the bushing device 100. The threads can push the cantilevered concave legs 112 outward (e.g., away from the center axis 106) to cause the concave legs 112 (e.g., the ramps 118) to engage the inner surface of the hole 610 in the sixth component 602. This can cause the bushing device 100 to couple and secure the three components 600, 602, 604 to each other.

Figure 7:
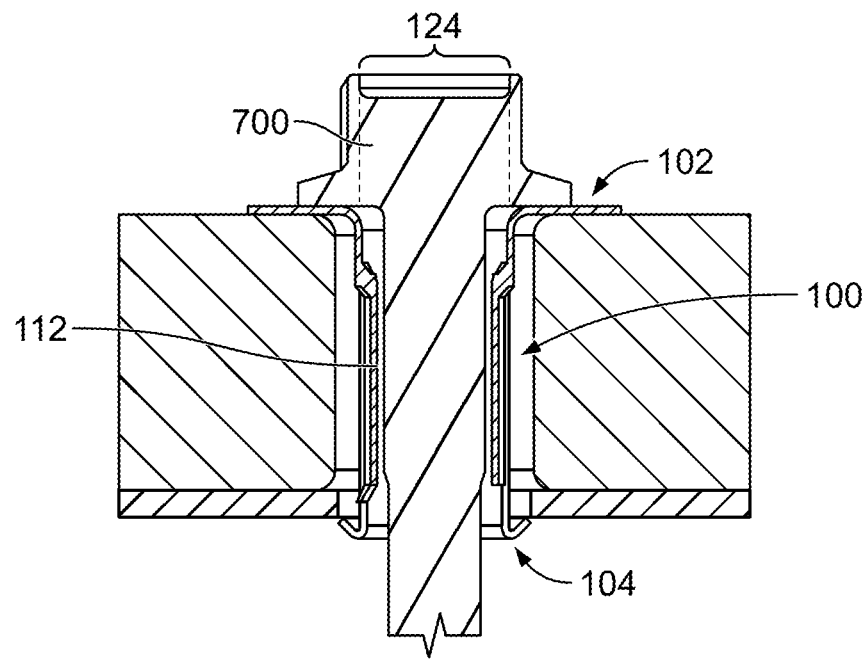
FIG. 7 illustrates a cross-sectional view of one embodiment of the bushing device shown in FIG. 1 with a fastener received in the bushing device.

FIG. 7 illustrates a cross-sectional view of one embodiment of the bushing device 100 with a fastener 700 received in the bushing device 100. As shown, the fastener 700 (such as a bolt or screw) can be inserted into the bushing device 100 through the center opening 124 in the cap end 102. The fastener 700 can engage the inner surfaces of the concave legs 112 of the bushing device 100 to secure the fastener 700 to the bushing device 100. A nut with threads can be coupled with an end of the fastener 700 that projects out of the distal end 104 of the bushing device 100. This nut or other component can help to secure the bushing device 100 to the components 600, 602, and can help compress the components 600, 602 against each other between the cap end 102 and the nut.

Figure 8:
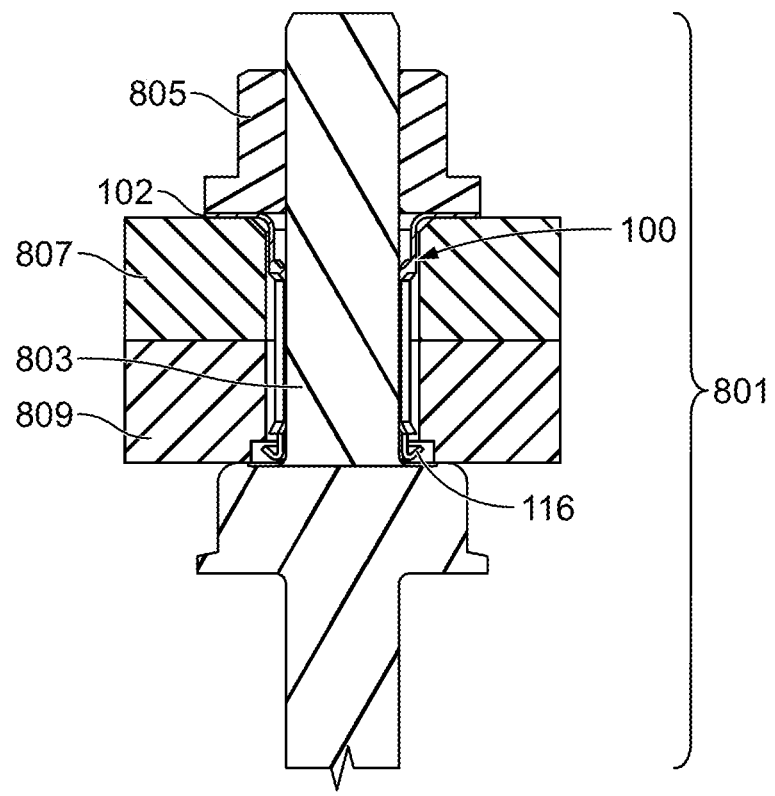
FIG. 8 illustrates a cross-sectional view of the bushing device shown in FIG. 1 coupling components together.

FIG. 8 illustrates a cross-sectional view of the bushing device 100 coupling components 807, 809 together. The bushing device 100 can be inserted into openings in the components 807, 809 (e.g., a clamping plate and thin sheet metal) as shown in FIG. 8. A fastening assembly 801 formed from an elongated member 803 and a fastener 805 can be used with the bushing device 100 to the components 807, 809. For example, the bushing device 100 can be long enough that the cap end 102 of the bushing device 100 engages one side of the component 807 while the hooks 116 engage an opposite side of the component 809 or a ledge 508 inside a countersunk hole in the component 809. The hooks 116 can prevent the bushing device 100 from being removed (and to prevent the components 807, 809 from being separated) without pushing the legs 110 with the hooks 116 inward.

The elongated member 803 (e.g., a bolt, stud, screw, etc.) can be inserted inside the bushing device 100 along the center axis 106. The fastener 805 (e.g., a threaded nut) can mate with an outer threaded surface of the elongated member 803 to secure the bushing device 100 between the member 803 and the fastener 805, and to help secure the components 807, 809 together, as shown in FIG. 8.

Figure 9:
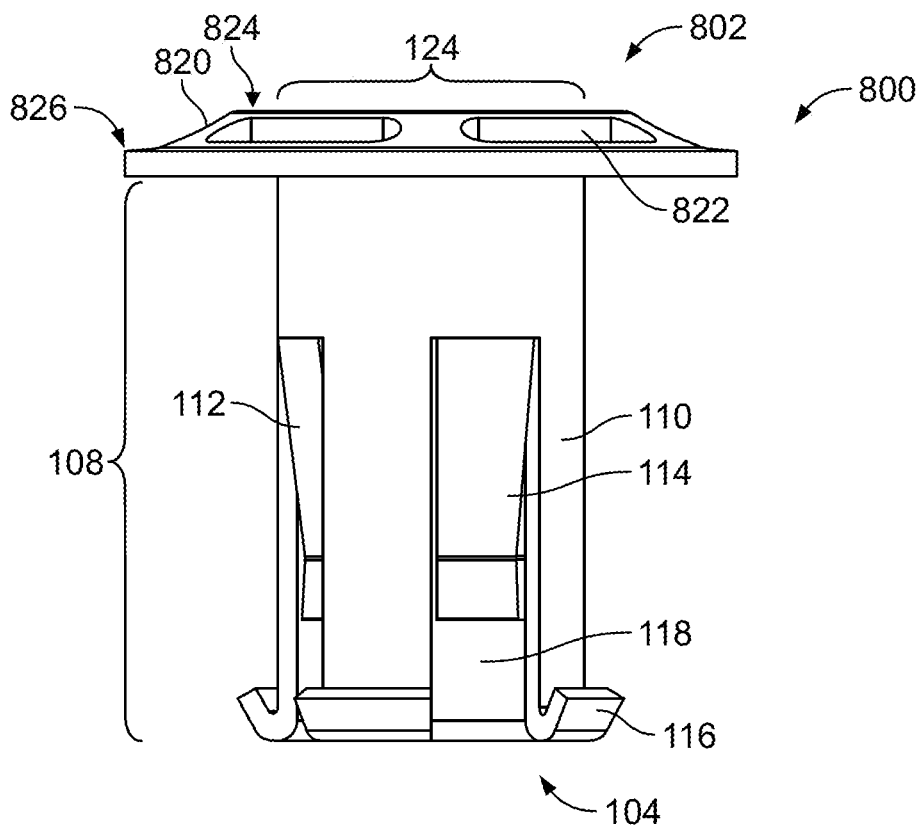
FIG. 9 illustrates a side view of another embodiment of a bushing device.
Figure 10:
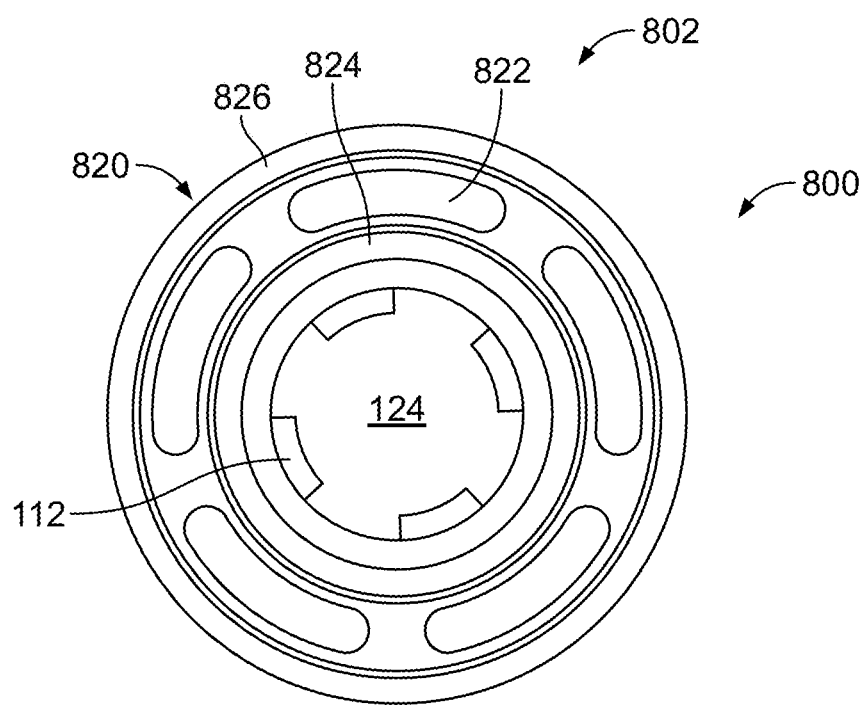
FIG. 10 illustrates a top view of the bushing device shown in FIG. 9.
Figure 11:
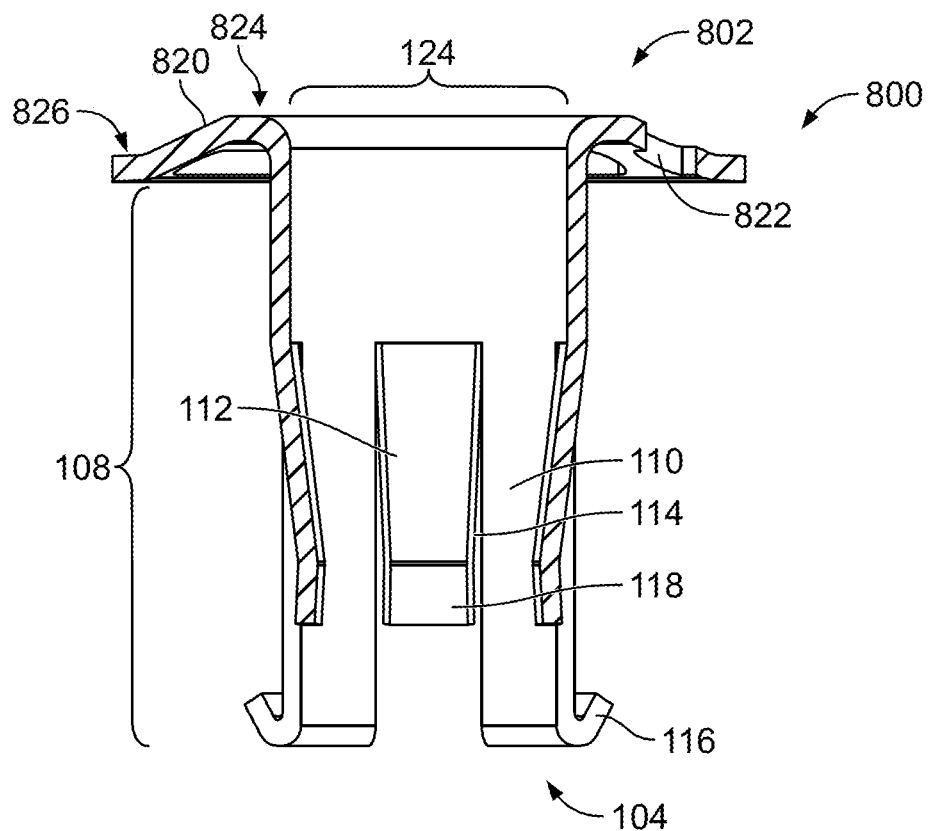
FIG. 11 is a cross-sectional view of the bushing device shown in FIGS. 9 and 10.

FIG. 9 illustrates a side view of another embodiment of a bushing device 800. FIG. 10 illustrates a top view of the bushing device 800 shown in FIG. 9. FIG. 11 is a cross-sectional view of the bushing device 800 shown in FIGS. 9 and 10. The bushing device 800 has many similar or identical features and components as the bushing device 100 shown and described in connection with FIGS. 1 through 8. For example, the bushing device 800 also can include the barrel body 108, the legs 110, 112, the gaps 114, the insertion end 104, the hooks 116, and the ramps 118.

One difference between the bushing device 100 shown in FIGS. 1 through 8 and the bushing device 800 is the cap ends of the devices 100, 800. The bushing device 800 has a spring cap end 802 having a spring flange 820. The spring flange 820 radially projects from the center axis 106 similar to the flange 120 of the bushing device 100 shown in FIGS. 1 through 8. The spring flange 820, however, is not flat and is not solid like the flange 120. The spring flange 820 includes several openings or slots 822 that are curved to be shaped parallel to the outer circular perimeter or circumference of the spring flange 820.

Additionally, the spring flange 820 includes a center rim portion 824 that is raised relative to an outer rim portion 826. The center rim portion 824 circumferentially surrounds the periphery of the center opening 124 of the cap end 802 and the outer rim portion 826 is disposed radially outside of the center rim portion 824 (relative to the center axis 106). The elongated openings or slots 822 are disposed between the center rim portion 824 and the outer cap end portion 826. The center rim portion 824 and the outer rim portion 826 are located at different axial locations along the center axis 106. For example, in the perspective of FIGS. 9 and 11, the center rim portion 824 is raised higher than the outer rim portion 826.

The difference in axial positions of the rim portions 824, 826 causes the spring flange 820 to exert a spring force on a component beneath the spring flange 820 responsive to a downward force applied by a fastener (e.g., the head of a bolt inserted into the bushing device 800 through the cap end 802). For example, when a bolt or stud is inserted into the bushing device 800 through the cap end 802, the spring flange 820 provides more a consistent clamp load on the component that is beneath the spring flange 820. The flex provided by the spring flange 820 also compensates for manufacturing tolerances in the size of the bushing device 800 and thermal expansion or contraction of the components being coupled by the bushing device 800.

The number, size, and/or shape of the openings or slots 822 in the spring flange 820 can be changed to provide different spring forces created by the flange 820. The example, the size (e.g., outer radial distance from the center axis) of the outer perimeter of the flange can be increased or decreased, the number of openings in the flange, the size of the openings in the flange, the locations of the openings in the flange, the shape of the openings in the flange, etc., can be modified or tuned to provide a desired force on the components being clamped together by the bushing. When used with a fastener such as a bolt or stud, the spring flange provides a more consistent clamp load on the component by introducing a spring between the fastener and clamped component (e.g., relative to a flange that is not a spring flange). The flex in the spring flange also compensates for manufacturing tolerances and thermal expansion or contraction of the components. In one embodiment, no openings or slots 822 are provided in the spring flange 820.

Figure 12:
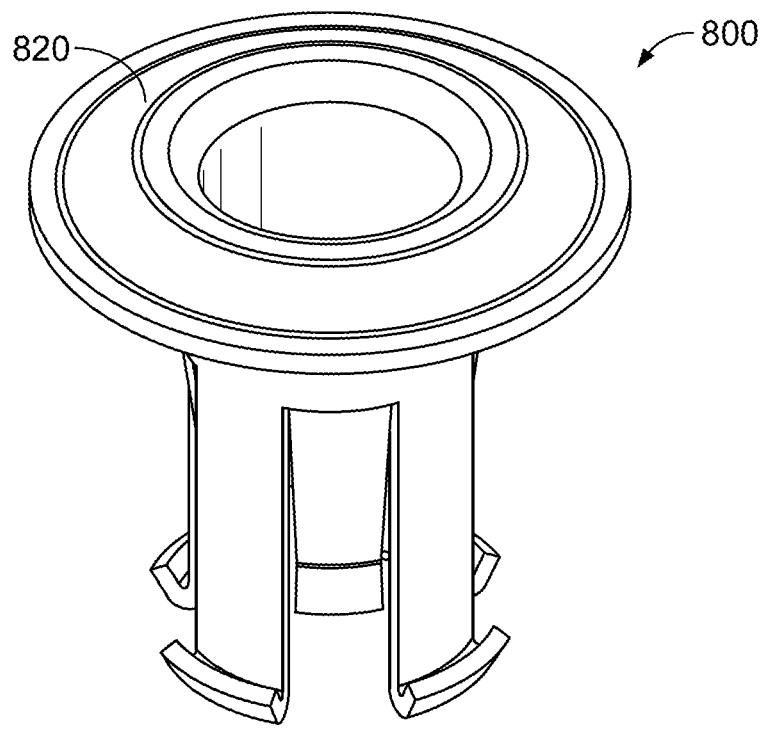
FIG. 12 illustrates a perspective view of another embodiment of the bushing device with no openings or slots in a spring flange of the bushing device.
Figure 13:
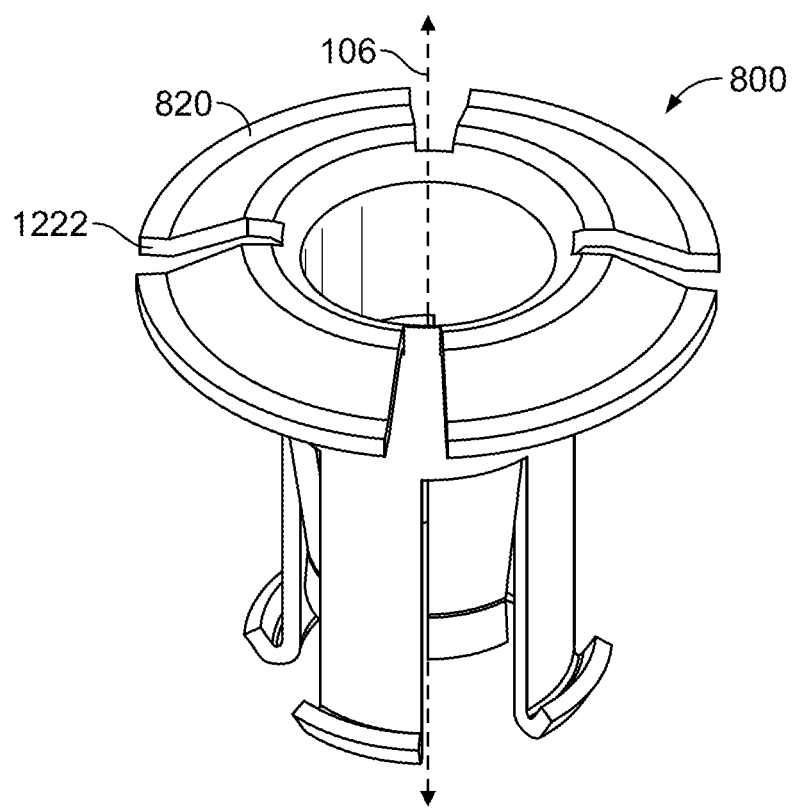
FIG. 13 illustrates a perspective view of the bushing device with openings in the spring flange that are elongated in directions that are oriented toward a center axis.

For example, FIG. 12 illustrates a perspective view of another embodiment of the bushing device 800 with no openings or slots 822 in the spring flange 820. FIG. 13 illustrates a perspective view of another embodiment of the bushing device 800 with radially oriented openings or slots 1222 in the spring flange 820. The openings or slots 822 in the bushing device 800 shown in FIGS. 9 through 11 are oriented or elongated along directions that encircle the center axis 106.

In contrast, the openings or slots 1222 in the embodiment of the bushing device 800 shown in FIG. 13 are elongated in directions that are oriented toward the center axis 106. The openings or slots 1222 may have open ends at the outer circumference or rim of the spring flange 820 of the bushing device 800 and extend toward, but not all the way to, the center axis 106. The different shaped spring flanges shown in FIGS. 9 through 13 can provide different spring forces on the components being joined by the bushing devices 800 shown in FIGS. 9 through 13 due to the presence, absence, shape, size, number, and/or orientation of the slots or openings in the spring flanges. Optionally, the height of the center rim portion of the spring flange relative to the outer rim portion of the spring flange can be increased or decreased to create greater or lesser spring forces on the components being joined by the bushing device.

Figure 14:
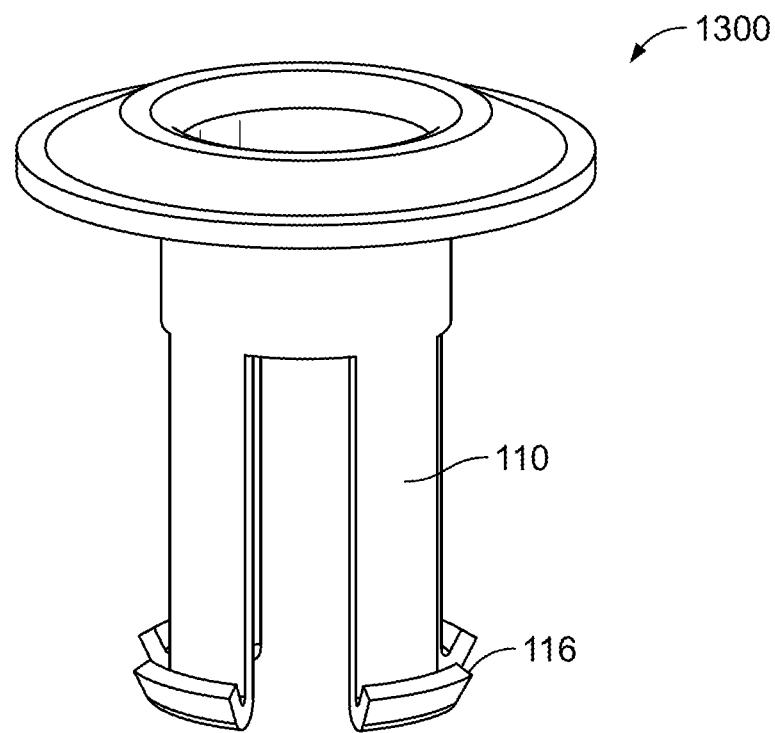
FIG. 14 illustrates a perspective view of another embodiment of a bushing device.
Figure 15:
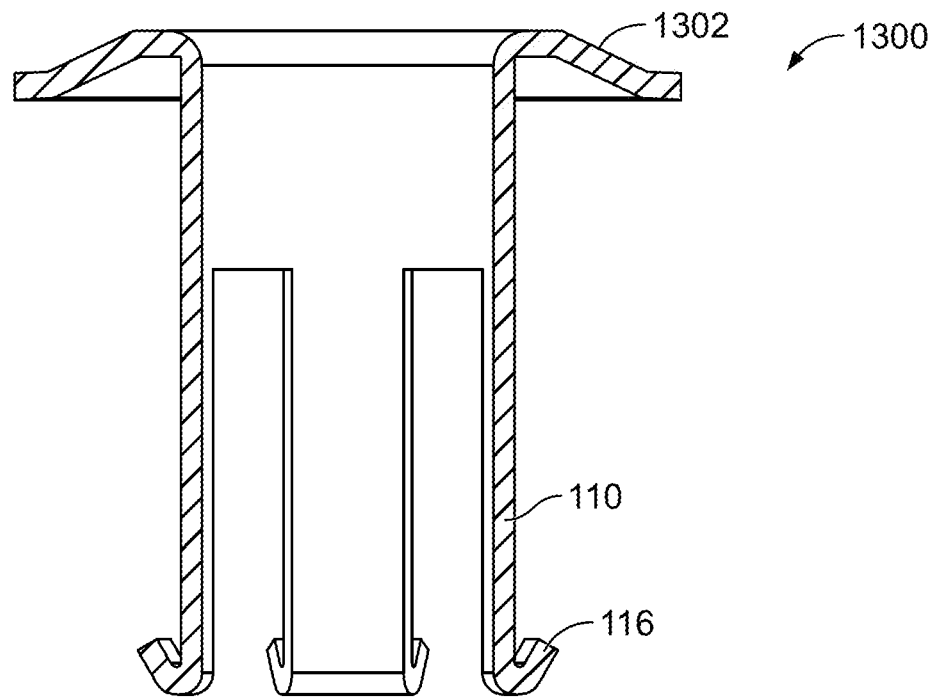
FIG. 15 illustrates a cross-sectional view of the bushing device shown in FIG. 14.
Figure 16:
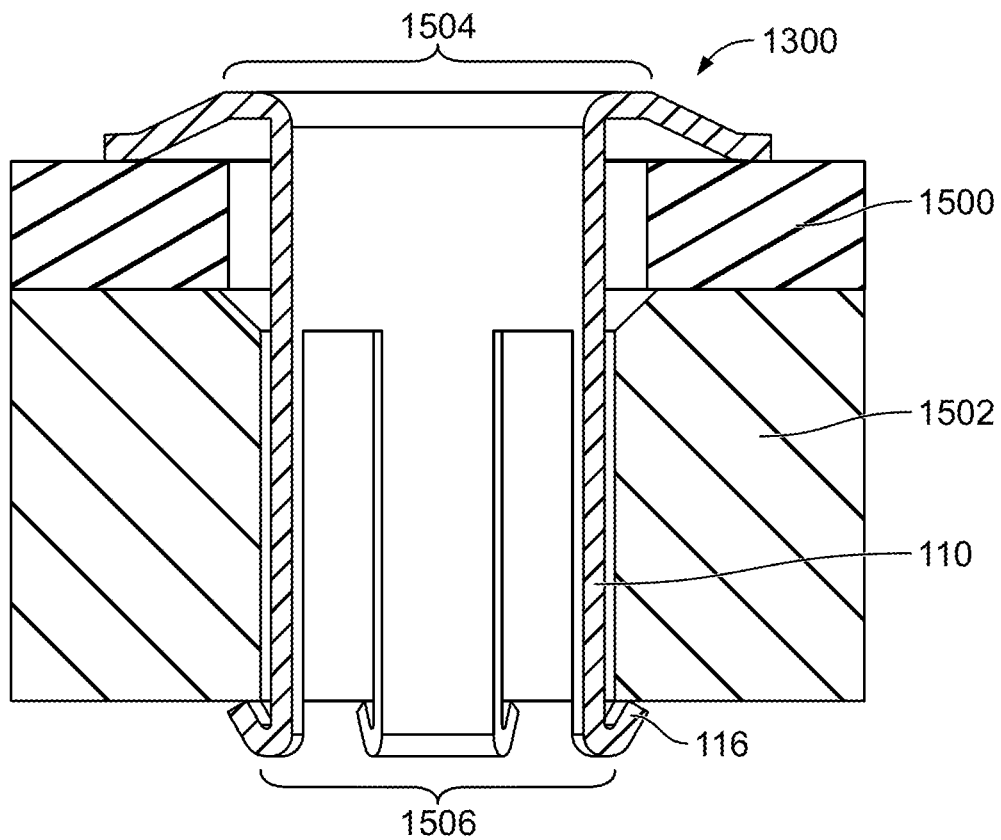
FIG. 16 illustrates a cross-sectional view of the bushing device shown in FIGS. 14 and 15 coupling components together.

FIG. 14 illustrates a perspective view of another embodiment of a bushing device 1300. FIG. 15 illustrates a cross-sectional view of the bushing device 1300 shown in FIG. 14. FIG. 16 illustrates a cross-sectional view of the bushing device 1300 shown in FIGS. 14 and 15 coupling components 1500, 1502 together. The bushing device 1300 may be similar to the bushing devices having the spring flanges shown and described herein, but may not include the legs 112 with the ramps 118 at the distal ends of the legs 112. For example, the bushing device 1300 may only include cantilevered beams as legs having the hooks 116 at the distal ends of the beams. Alternatively, the bushing device 1300 can include one or more of the legs 112 with the ramps 118. The bushing device 1300 can be inserted into openings 1504, 1506 in the components 1500, 1502 (e.g., a clamping plate and thin sheet metal) and can couple the components 1500, 1502 with each other without a bolt or other fastener being inserted into the bushing device 1300. For example, the length of the bushing device 1300 can be long enough that a cap end 1302 of the bushing device 1300 engages one side of the component 1500 while the hooks 116 engage an opposite side of the component 1502, as shown in FIG. 16. The hooks 116 can extend along at least part of the side of the component 1502 to prevent the bushing device 1300 from being removed (and to prevent the components 1500, 1502 from being separated) without pushing the legs 110 with the hooks 116 inward.

Figure 17:
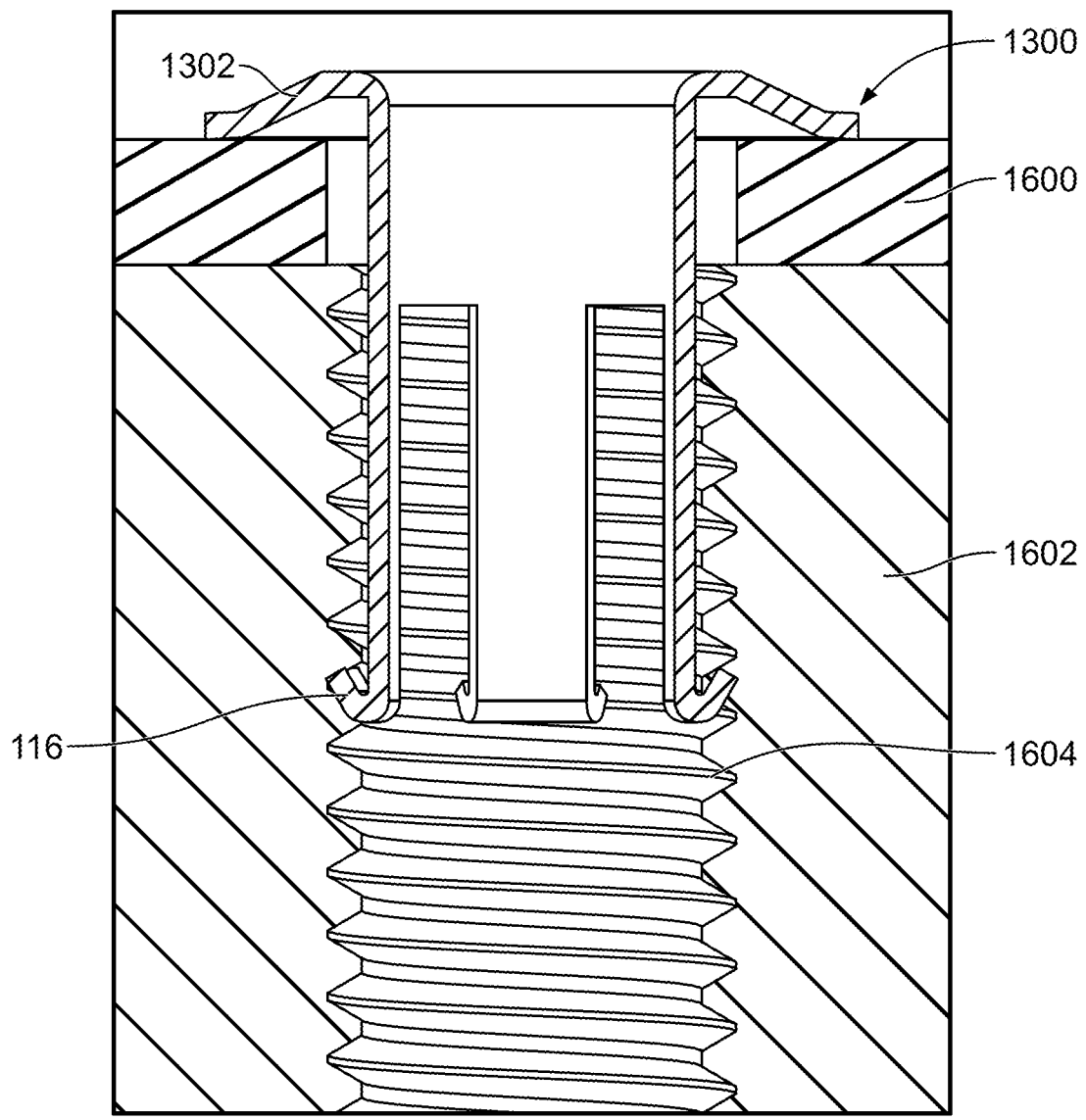
FIG. 17 illustrates the bushing device coupling components with each other according to another embodiment.

Optionally, the bushing device 1300 can be used to engage threads to couple components with each other. FIG. 17 illustrates the bushing device 1300 coupling components 1600, 1602 (e.g., clamping plates and/or sheet metal) with each other according to another embodiment. One difference between the embodiments shown in FIGS. 16 and 17 is the presence of threads 1604 along the inner surface of the hole in the component 1602. The hooks 116 of the bushing device 1300 can engage the threads 1604 to secure the bushing device 1300 to the component 1602. The cap end 1302 of the bushing device 1300 can engage the other component 1600 to secure the components 1600, 1602 with each other, as shown in FIG. 17.

Figure 18:
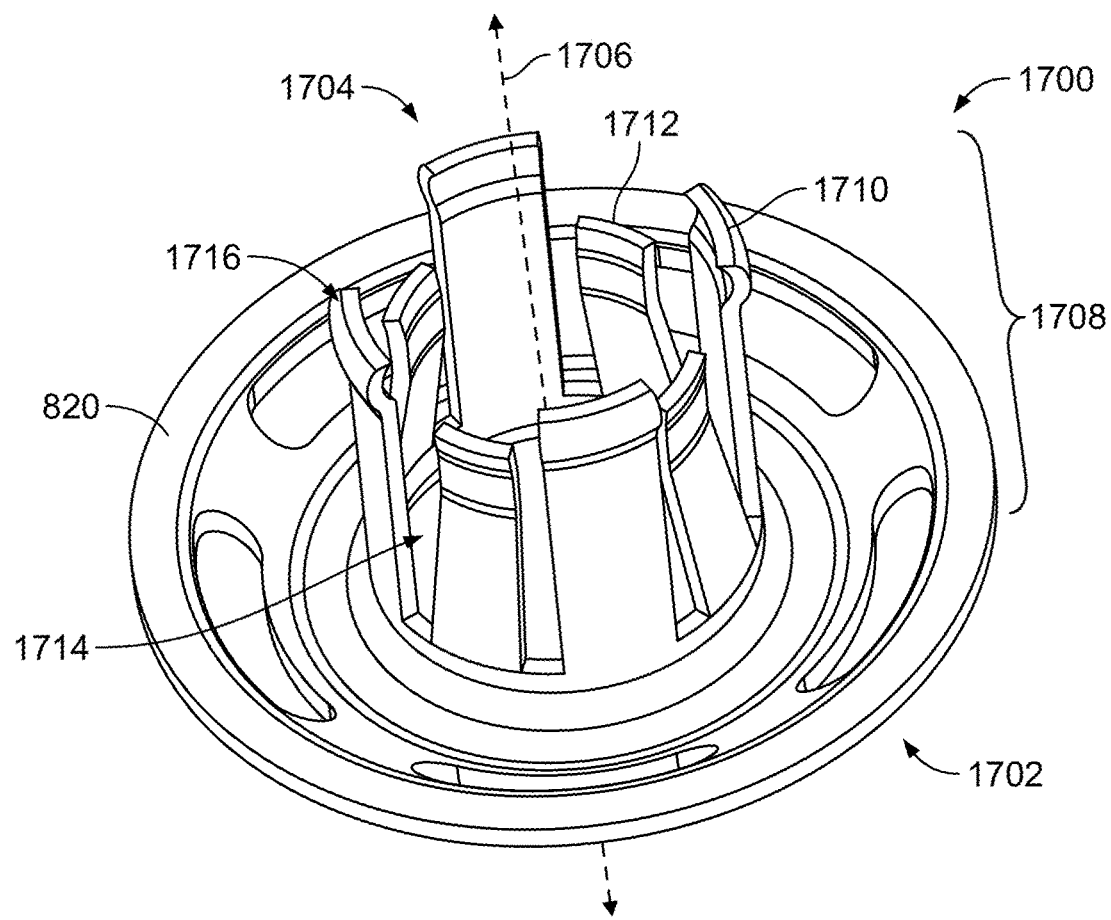
FIG. 18 illustrates one embodiment of a perspective view of a bushing device.
Figure 19:
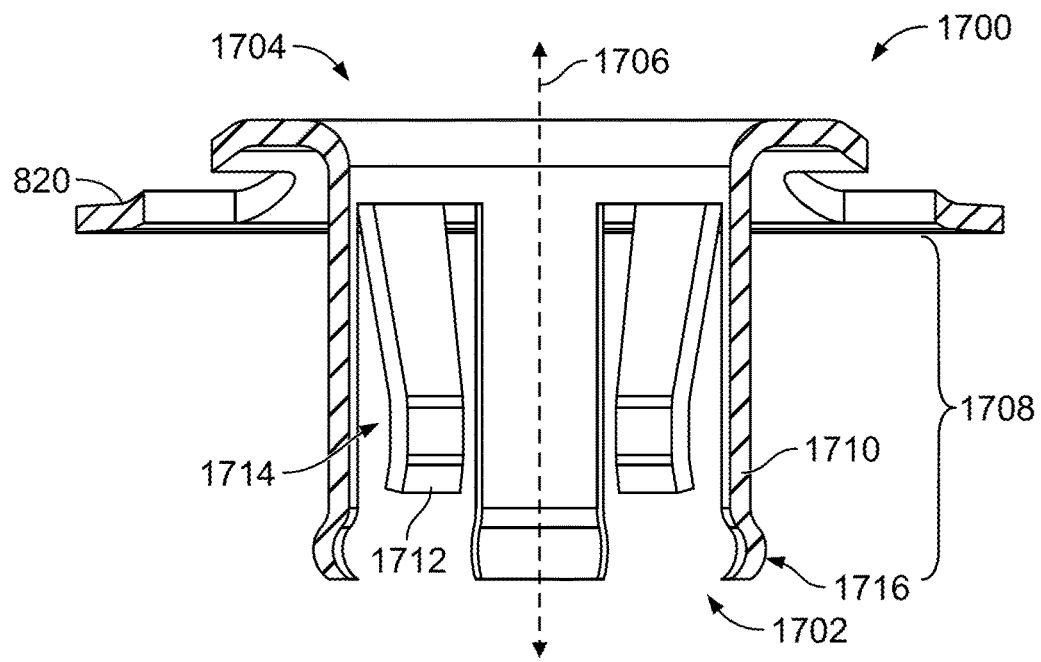
FIG. 19 illustrates a cross-sectional view of the bushing device shown in FIG. 18.

FIG. 18 illustrates one embodiment of a perspective view of a bushing device 1700. FIG. 19 illustrates a cross-sectional view of the bushing device 1700 shown in FIG. 18. The bushing device 1700 is an elongated component that extends from a cap end 1702 to an opposite insertion end 1704. The bushing device 1700 can be elongated in a direction that extends along a center axis 1706 from the cap end 1702 to the insertion end 1704. The bushing device 1700 can be symmetric around or about the center axis 1706 in one embodiment.

The bushing device 1700 has a barrel body 1708 that extends along the center axis 1706 from the cap end 1702. The barrel body 1708 has a slotted cylindrical shape that circumferentially surrounds the center axis 1706 such that no part of the barrel body 1708 contacts or extends across the center axis 1706 in the illustrated embodiment. Alternatively, the barrel body 1708 may be at least partially filled so that the center axis 1706 extends through at least part of the barrel body 1708.

The barrel body 1708 is formed from several elongated legs 1710, 1712. The legs 1710, 1712 are segmented portions of the barrel body 1708 that are separated from each other along a circumference or outer perimeter of the barrel body 1708 by axial gaps 1714. The axial gaps 1714 extend from the insertion end 1704 of the barrel body 1708 (and of the bushing device 1700) toward, but not all the way to, the cap end 1702 of the bushing device 1700. For example, the axial gaps 1714 can extend from the insertion end 1704 of the barrel body 1708 to locations that are three quarters or seventy-five percent of the distance from the insertion end 1704 to the interface between the barrel body 108 and the cap end 1702. Alternatively, the axial gaps 1714 can extend a smaller or longer distance from the insertion end 1704.

The axial gaps 1714 segment the legs 1710, 1712 such that the legs 1710, 1712 are cantilevered beams. The legs 1710, 1712 can individually flex or bend inward toward the center axis 1706 responsive to application of a force applied radially inward toward the center axis 1706. The legs 1710, 1712 can return to the original positions responsive to removal of the radially inward force. Optionally, the legs 1710, 1712 can individually flex or bend inward toward the center axis 1706 responsive to application of a force applied radially outward from the center axis 1706. The legs 1710, 1712 can return to the original positions responsive to removal of the radially outward force.

In the illustrated embodiment, the legs 1710, 1712 include four sets of opposing pairs of legs 1710, 1712. Each of these pairs can include two convex legs 1710 or two concave legs 1712. The convex legs 1710 include outer surfaces that are curved inward in directions radially inward and toward the center axis 1706. For example, in contrast to other convex legs described herein, the legs 1310 include curved ends that are curved inward toward the center axis 1706. Conversely, the concave legs 1712 include outer surfaces that are curved inward in directions radially toward the center axis 1706. Alternatively, a different number of pairs of the legs 1710, 1712 can be provided, the legs 1710, 1712 may not be provided in pairs, or a different number of the legs 1710 and/or the legs 1712 may be included.

The legs 1710, 1712 can extend along the center axis 1706 to different distances from the cap end 1702. In the illustrated embodiment, the convex legs 1710 are longer than the concave legs 1712 in directions that are parallel to the center axis 1706. Alternatively, the concave legs 1712 are longer than the convex legs 1710 in directions that are parallel to the center axis 1706. In another embodiment, the convex legs 1710 and the concave legs 1712 are the same lengths in directions parallel to the center axis 1706.

The convex legs 1710 can include clipping hooks 1716 at distal ends of the convex legs 1710 (e.g., at the insertion end 1704), similar to the clipping hooks 116 described herein. The clipping hooks include lengths of the legs 1710 that bend slightly inward (toward the center axis 1706). In another embodiment, one or more (or all) of the convex legs 1710 do not include the clipping hook 1716.

The concave legs 1712 can include ramps at distal ends of the concave legs 1712 (e.g., at or near the insertion end 1704), similar to the ramps 118 shown in FIG. 1. In another embodiment, one or more (or all) of the concave legs 1712 do not include the ramp 1718.

The cap end 1702 of the bushing device 1700 includes the spring flange 820 described above. Alternatively, the cap end 1702 can include another type of spring flange or a flange that does not operate as a spring.

The hooks at the ends of the legs 1710 can extend around and hook onto the end of another component, such as a bolt, screw, or the like, that is inserted into the center of the bushing device 1700. The interior surfaces of the concave legs 1712 are positioned to interfere with (e.g., engage) a major pitch diameter of a threaded fastener (e.g., a screw). The fastener may be securely retained by the inwardly-directed surfaces of the concave legs 1712 through frictional engagement between the fastener and the inner surfaces of the concave legs 1712. The concave legs 1712 may slightly deflect outward when the fastener is into the interior of the bushing device 1700 (e.g., along the center axis 1706).

Figure 20:
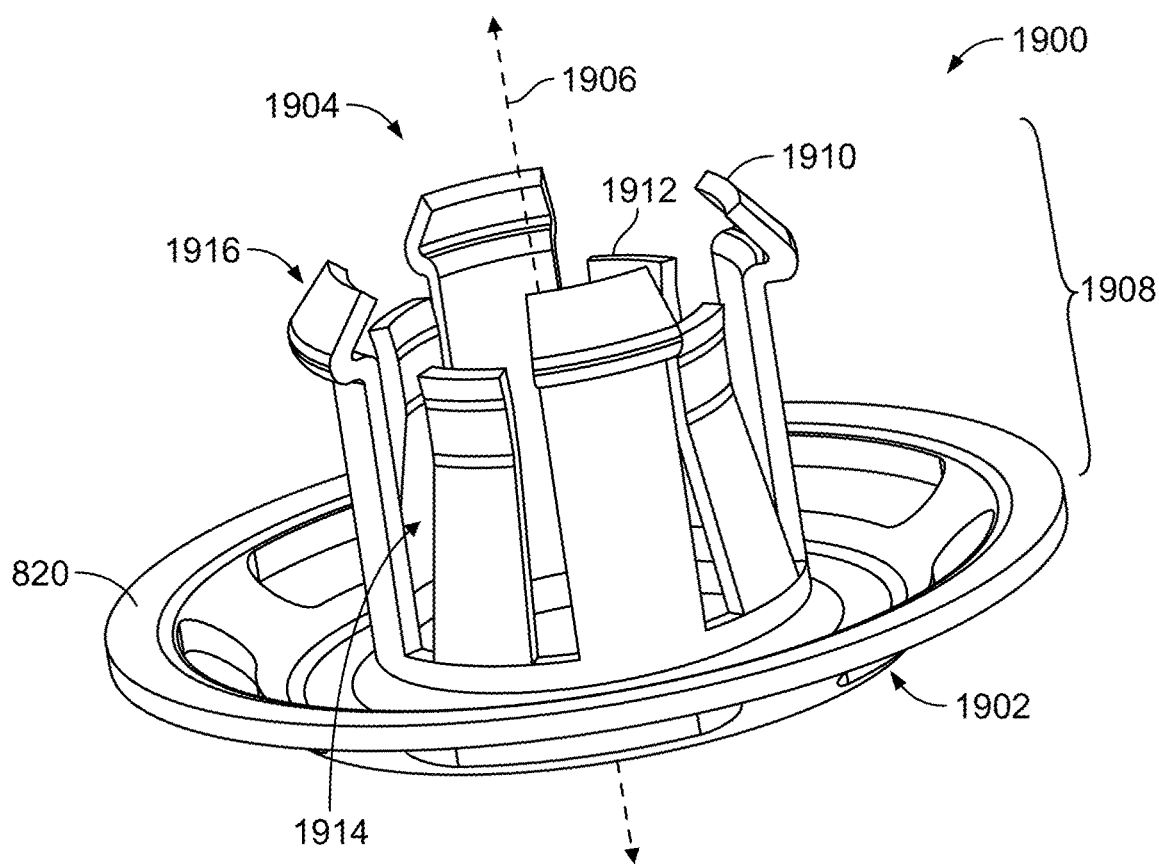
FIG. 20 illustrates one embodiment of a perspective view of a bushing device.
Figure 21:
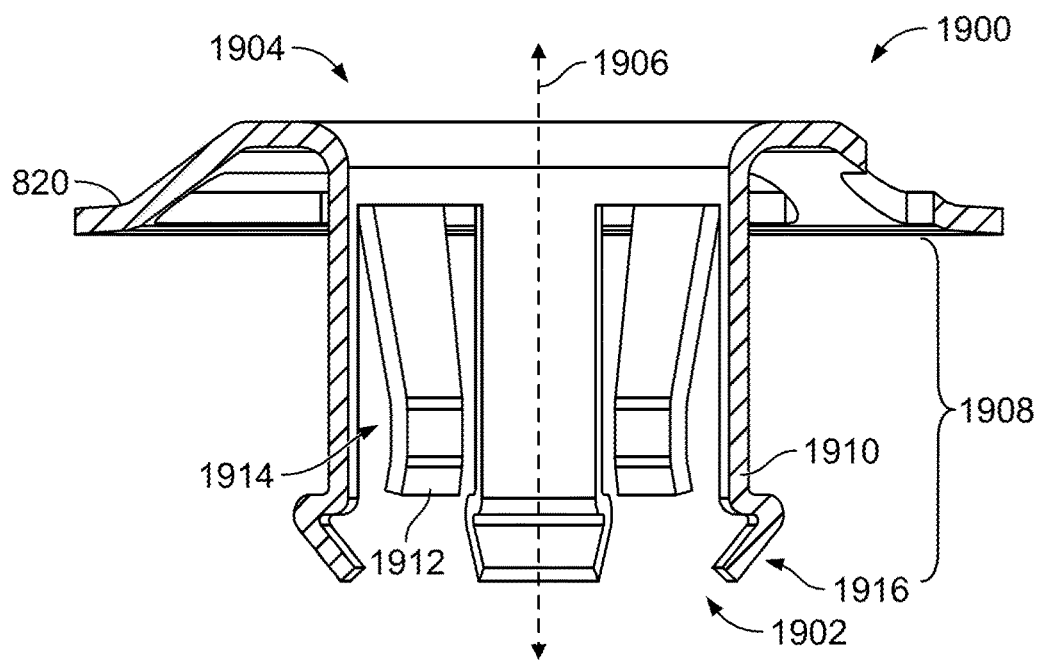
FIG. 21 illustrates a cross-sectional view of the bushing device shown in FIG. 20.

FIG. 20 illustrates one embodiment of a perspective view of a bushing device 1900. FIG. 21 illustrates a cross-sectional view of the bushing device 1900 shown in FIG. 20. The bushing device 1900 is an elongated component that extends from a cap end 1902 to an opposite insertion end 1904. The bushing device 1900 can be elongated in a direction that extends along a center axis 1906 from the cap end 1902 to the insertion end 1904. The bushing device 1900 can be symmetric around or about the center axis 1906 in one embodiment.

The bushing device 1900 has a barrel body 1908 that extends along the center axis 1906 from the cap end 1902. The barrel body 1908 has a slotted cylindrical shape that circumferentially surrounds the center axis 1906 such that no part of the barrel body 1908 contacts or extends across the center axis 1906 in the illustrated embodiment. Alternatively, the barrel body 1908 may be at least partially filled so that the center axis 1906 extends through at least part of the barrel body 1908.

The barrel body 1908 is formed from several elongated legs 1910, 1912. The legs 1910, 1912 are segmented portions of the barrel body 1908 that are separated from each other along a circumference or outer perimeter of the barrel body 1908 by axial gaps 1914. The axial gaps 1914 extend from the insertion end 1904 of the barrel body 1908 (and of the bushing device 1900) toward, but not all the way to, the cap end 1902 of the bushing device 1900. For example, the axial gaps 1914 can extend from the insertion end 1904 of the barrel body 1908 to locations that are three quarters or seventy-five percent of the distance from the insertion end 1904 to the interface between the barrel body 108 and the cap end 1902. Alternatively, the axial gaps 1914 can extend a smaller or longer distance from the insertion end 1904.

The axial gaps 1914 segment the legs 1910, 1912 such that the legs 1910, 1912 are cantilevered beams. The legs 1910, 1912 can individually flex or bend inward toward the center axis 1906 responsive to application of a force applied radially inward toward the center axis 1906. The legs 1910, 1912 can return to the original positions responsive to removal of the radially inward force. Optionally, the legs 1910, 1912 can individually flex or bend inward toward the center axis 1906 responsive to application of a force applied radially outward from the center axis 1906. The legs 1910, 1912 can return to the original positions responsive to removal of the radially outward force.

In the illustrated embodiment, the legs 1910, 1912 include four sets of opposing pairs of legs 1910, 1912. Each of these pairs can include two convex legs 1910 or two concave legs 1912. The convex legs 1910 include outer surfaces that are curved inward in directions radially inward and toward the center axis 1906. For example, in contrast to other convex legs described herein, the legs 1310 include curved ends that are curved inward toward the center axis 1906. Conversely, the concave legs 1912 include outer surfaces that are curved inward in directions radially toward the center axis 1906. Alternatively, a different number of pairs of the legs 1910, 1912 can be provided, the legs 1910, 1912 may not be provided in pairs, or a different number of the legs 1910 and/or the legs 1912 may be included.

The legs 1910, 1912 can extend along the center axis 1906 to different distances from the cap end 1902. In the illustrated embodiment, the convex legs 1910 are longer than the concave legs 1912 in directions that are parallel to the center axis 1906. Alternatively, the concave legs 1912 are longer than the convex legs 1910 in directions that are parallel to the center axis 1906. In another embodiment, the convex legs 1910 and the concave legs 1912 are the same lengths in directions parallel to the center axis 1906.

The convex legs 1910 can include clipping hooks 1916 at distal ends of the convex legs 1910 (e.g., at the insertion end 1904). The clipping hooks include lengths of the legs 1910 that bend slightly inward (toward the center axis 1906). In another embodiment, one or more (or all) of the convex legs 1910 do not include the clipping hook 1916.

As shown in FIGS. 20 and 21, the shape of the clipping hooks 1916 differs from the shape of the clipping hooks 116, 1716 shown herein. The clipping hooks 1916 are formed by two straight or predominantly straight segments 1901, 1903 joined together with each other (e.g., at least 90% of the length of each segment is linear or planar). This contrasts with the clipping hooks 1716, which are rounded or curved over all or predominantly all of the hooks 1716. In contrast to the hooks 116, the hooks 1916 are bent inward toward the center axis 1906, whereas the hooks 116 are bent outward and away from the center axis 106.

The concave legs 1912 can include ramps at distal ends of the concave legs 1912 (e.g., at or near the insertion end 1904), similar to the ramps 118 shown in FIG. 1. In another embodiment, one or more (or all) of the concave legs 1912 do not include the ramp 1918.

The cap end 1902 of the bushing device 1900 includes the spring flange 820 described above. Alternatively, the cap end 1902 can include another type of spring flange or a flange that does not operate as a spring.

The clipping hooks 1916 can deflect into a securing position in relation to a chamfered or counter-bore hole on an opposite surface of a thin section component. The clipping hooks 1916 can engage the section component to cause the bushing device 1900 to compressively sandwich the section component and at least one other component between the clipping hooks 1916 and the flange 820 of the cap end 1902. The interior surfaces of the concave legs 1912 are positioned to interfere with (e.g., engage) a major pitch diameter of a threaded fastener (e.g., a screw). The fastener may be securely retained by the inwardly-directed surfaces of the concave legs 1912 through frictional engagement between the fastener and the inner surfaces of the concave legs 1912. The concave legs 1912 may slightly deflect outward when the fastener is into the interior of the bushing device 1900 (e.g., along the center axis 1906).

In one embodiment, a bushing device is provided that includes a cap end shaped to engage a first surface of a first component having a first hole, and a slotted barrel body coupled with the cap end and elongated along a center axis. The slotted barrel body includes plural first cantilevered beam legs extending away from the cap end in directions that are parallel to the center axis. One or more of the first cantilevered beam legs has a hook at a distal end of the one or more first cantilevered beam legs. The slotted barrel body is shaped to fit inside the first hole in the first component and into a concentric second hole in a second component. The hook of the one or more first cantilevered beam legs is positioned to engage the second component to secure the first component and the second component together.

Optionally, the slotted barrel body also includes plural second cantilevered beam legs extending away from the cap end in directions that are parallel to the center axis, at least one of the second cantilevered beam legs having a concave surface that is curved inward toward the center axis.

Optionally, the first cantilevered beam legs have convex surfaces that are curved outward and away from the center axis.

Optionally, one or more of the second cantilevered beam legs includes a ramp at a distal end of the one or more second cantilevered beam legs that projects away from the center axis.

Optionally, the cap end includes a center opening through which the center axis extends, the center opening configured to receive a fastener through the cap end and into the barrel body.

Optionally, the cap end includes a radially protruding flange that surrounds the center axis.

Optionally, the flange of the cap end is planar.

Optionally, the flange of the cap end includes a center rim portion that surrounds a center opening through the cap end and an outer rim portion disposed radially outside of the center rim portion. The center rim portion and the outer rim portion can be located at different positions along the center axis.

Optionally, the flange includes one or more openings elongated along a circumferential direction around the center axis with the one or more openings located between the center rim portion and the outer rim portion.

Optionally, the flange includes one or more openings elongated in directions toward the center axis.

In one embodiment, a bushing device includes a cap end shaped to engage a first surface of a first component having a first hole, and a slotted barrel body coupled with the cap end and elongated along a center axis. The slotted barrel body includes first and second cantilevered beam legs extending away from the cap end in directions that are parallel to the center axis. The first cantilevered beam legs have hooks at distal ends of the first cantilevered beam legs. The second cantilevered beam legs have concave surfaces that are curved toward the center axis. The slotted barrel body is shaped to fit inside the first hole in the first component and into a concentric second hole in a second component. The hooks of the first cantilevered beam legs are positioned to engage the second component and the concave surfaces of the second cantilevered beam legs are shaped to engage a fastener inserted into the barrel body to secure the first component and the second component together.

Optionally, the first cantilevered beam legs have convex surfaces that are curved outward and away from the center axis.

Optionally, the cap end includes a center opening through which the center axis extends. The center opening can receive the fastener through the cap end and into the barrel body.

Optionally, the cap end includes a radially protruding flange that surrounds the center axis.

Optionally, the flange of the cap end includes a center rim portion that surrounds a center opening through the cap end and an outer rim portion disposed radially outside of the center rim portion. The center rim portion and the outer rim portion can be located at different positions along the center axis.

Optionally, the flange includes one or more openings elongated along a circumferential direction around the center axis with the one or more openings located between the center rim portion and the outer rim portion.

Optionally, the flange includes one or more openings elongated in directions toward the center axis.

In one embodiment, a bushing device includes a cap end shaped to engage a first surface of a first component having a first hole. The cap end includes a center rim portion that encircles a center opening through the cap end and an outer rim portion that encircles the center rim portion and that is disposed radially outside of the center rim portion. The bushing device also includes a slotted barrel body coupled with the cap end and elongated along a center axis, the slotted barrel body including cantilevered beam legs extending away from the cap end in directions that are parallel to the center axis. The cantilevered beam legs have one or more hooks at distal ends of the cantilevered beam legs. The slotted barrel body is shaped to fit inside the first hole in the first component and into a concentric second hole in a second component. The one or more hooks of the cantilevered beam legs are positioned to engage the second component and the concave surfaces of the second cantilevered beam legs are shaped to engage a fastener inserted into the barrel body through the center opening in the end cap to secure the first component and the second component together. The center rim portion of the end cap is located farther from the cantilevered beam legs than the outer rim portion of the end cap. The center rim portion of the end cap is configured to impart a spring force on one or more of the fastener or the first component responsive to the fastener being inserted into the center opening of the end cap.

Optionally, one or more of the cantilevered beam legs have a concave surface that is curved inward and toward the center axis to engage the fastener responsive to the fastener being inserted into the barrel body.

Optionally, the cap end includes one or more openings located between the center rim portion and the outer rim portion As described above, embodiments of the present disclosure provide a bushing that eliminates the need for projection weldment of a metal clamping plate to a stamped metal component. The bushing may be used as an alternative to applying a chemical adhesive to a component, which may potentially be difficult to pass cleanliness requirements of a stamped metal engine component, for example.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

What is claimed is:

1. A bushing device comprising:
   a cap end shaped to engage a first surface of a first component having a first hole; and
   a slotted barrel body coupled with the cap end and elongated along a center axis, the slotted barrel body including plural first cantilevered beam legs extending away from the cap end in directions that are parallel to the center axis, one or more of the first cantilevered beam legs having a hook at a distal end of the one or more first cantilevered beam legs,
   the slotted barrel body also includes plural second cantilevered beam legs extending away from the cap end in directions that are parallel to the center axis, at least one of the second cantilevered beam legs having a concave surface that is curved inward toward the center axis about an axis parallel to the center axis,
   wherein the slotted barrel body is shaped to fit inside the first hole in the first component and into a concentric second hole in a second component, the hook of the one or more first cantilevered beam legs positioned to engage the second component to secure the first component and the second component together.

2. The bushing device of claim 1, wherein the first cantilevered beam legs have convex surfaces that are curved outward and away from the center axis.

3. The bushing device of claim 1, wherein one or more of the second cantilevered beam legs includes a ramp at a distal end of the one or more second cantilevered beam legs that projects away from the center axis.

4. The bushing device of claim 1, wherein the cap end includes a center opening through which the center axis extends, the center opening configured to receive a fastener through the cap end and into the barrel body.

5. The bushing device of claim 1, wherein the cap end includes a radially protruding flange that surrounds the center axis.

6. The bushing device of claim 5, wherein the flange of the cap end is planar.

7. The bushing device of claim 5, wherein the flange of the cap end includes a center rim portion that surrounds a center opening through the cap end and an outer rim portion disposed radially outside of the center rim portion, and wherein the center rim portion and the outer rim portion are located at different positions along the center axis.

8. The bushing device of claim 7, wherein the flange is a spring flange that includes one or more openings elongated along a circumferential direction around the center axis with the one or more openings located between the center rim portion and the outer rim portion.

9. The bushing device of claim 7, wherein the flange is a spring flange that includes one or more openings elongated in directions toward the center axis.

10. A bushing device comprising:
a cap end shaped to engage a first surface of a first component having a first hole; and
a slotted barrel body coupled with the cap end and elongated along a center axis, the slotted barrel body including first and second cantilevered beam legs extending away from the cap end in directions that are parallel to the center axis, the first cantilevered beam legs having hooks at distal ends of the first cantilevered beam legs, the second cantilevered beam legs having concave surfaces that are curved toward the center axis about axes parallel to the center axis,
wherein the slotted barrel body is shaped to fit inside the first hole in the first component and into a concentric second hole in a second component, the hooks of the first cantilevered beam legs positioned to engage the second component and the concave surfaces of the second cantilevered beam legs shaped to engage a fastener inserted into the barrel body to secure the first component and the second component together.

11. The bushing device of claim 10, wherein the first cantilevered beam legs have convex surfaces that are curved outward and away from the center axis.

12. The bushing device of claim 10, wherein the cap end includes a center opening through which the center axis extends, the center opening configured to receive the fastener through the cap end and into the barrel body.

13. The bushing device of claim 10, wherein the cap end includes a radially protruding flange that surrounds the center axis.

14. The bushing device of claim 13, wherein the flange of the cap end includes a center rim portion that surrounds a center opening through the cap end and an outer rim portion disposed radially outside of the center rim portion, and wherein the center rim portion and the outer rim portion are located at different positions along the center axis.

15. The bushing device of claim 14, wherein the flange is a spring flange that includes one or more openings elongated along a circumferential direction around the center axis with the one or more openings located between the center rim portion and the outer rim portion.

16. The bushing device of claim 14, wherein the flange is a spring flange that includes one or more openings elongated in directions toward the center axis.

17. A bushing device comprising:
a cap end shaped to engage a first surface of a first component having a first hole, the cap end including a center rim portion that encircles a center opening through the cap end and an outer rim portion that encircles the center rim portion and that is disposed radially outside of the center rim portion; and
a slotted barrel body coupled with the cap end and elongated along a center axis, the slotted barrel body including first and second cantilevered beam legs extending away from the cap end in directions that are parallel to the center axis, the first cantilevered beam legs having one or more hooks at distal ends of the cantilevered beam legs, the second cantilevered beam legs having concave surfaces that are curved toward the center axis about axes parallel to the center axis,
wherein the slotted barrel body is shaped to fit inside the first hole in the first component and into a concentric second hole in a second component, the one or more hooks of the first cantilevered beam legs positioned to engage the second component and the concave surfaces of the second cantilevered beam legs shaped to engage a fastener inserted into the barrel body through the center opening in the end cap to secure the first component and the second component together,
wherein the center rim portion of the end cap is located farther from the first and second cantilevered beam legs along the center axis than the outer rim portion of the end cap, the center rim portion of the end cap configured to impart a spring force on one or more of the fastener or the first component responsive to the fastener being inserted into the center opening of the end cap.

18. The bushing device of claim 17, wherein the cap end includes a spring flange having one or more openings located between the center rim portion and the outer rim portion.

* * * * *